May 27, 1947.　　H. E. KORUM　　2,421,124
FEEDING DEVICE
Filed April 26, 1944　　4 Sheets-Sheet 1

INVENTOR.
HENRY E. KORUM
BY
ATTORNEYS

WITNESS
E. B. BJURSTROM

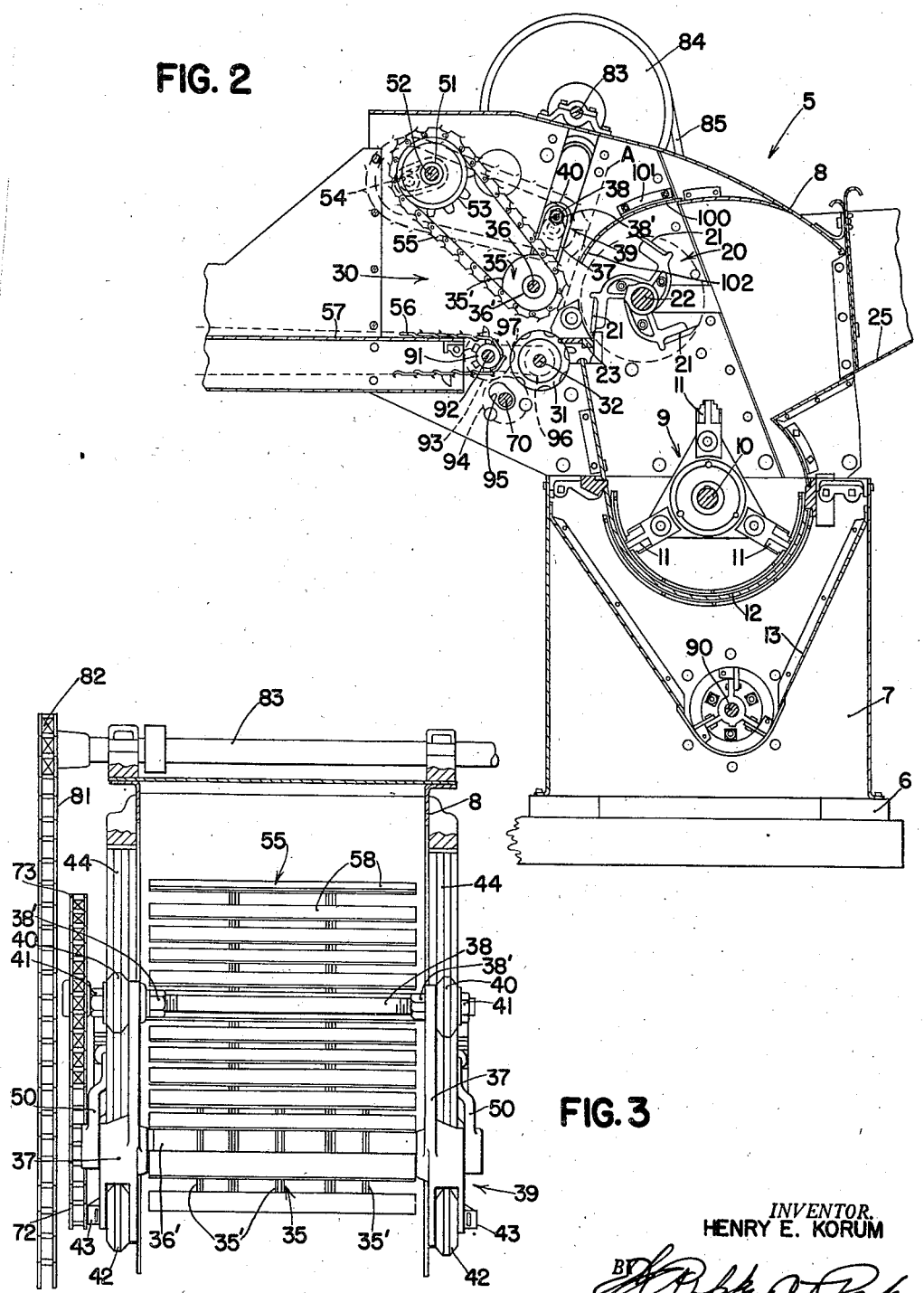

May 27, 1947.  H. E. KORUM  2,421,124
FEEDING DEVICE
Filed April 26, 1944  4 Sheets-Sheet 3

WITNESS
E. B. BJURSTROM

INVENTOR.
HENRY E. KORUM
BY
ATTORNEYS

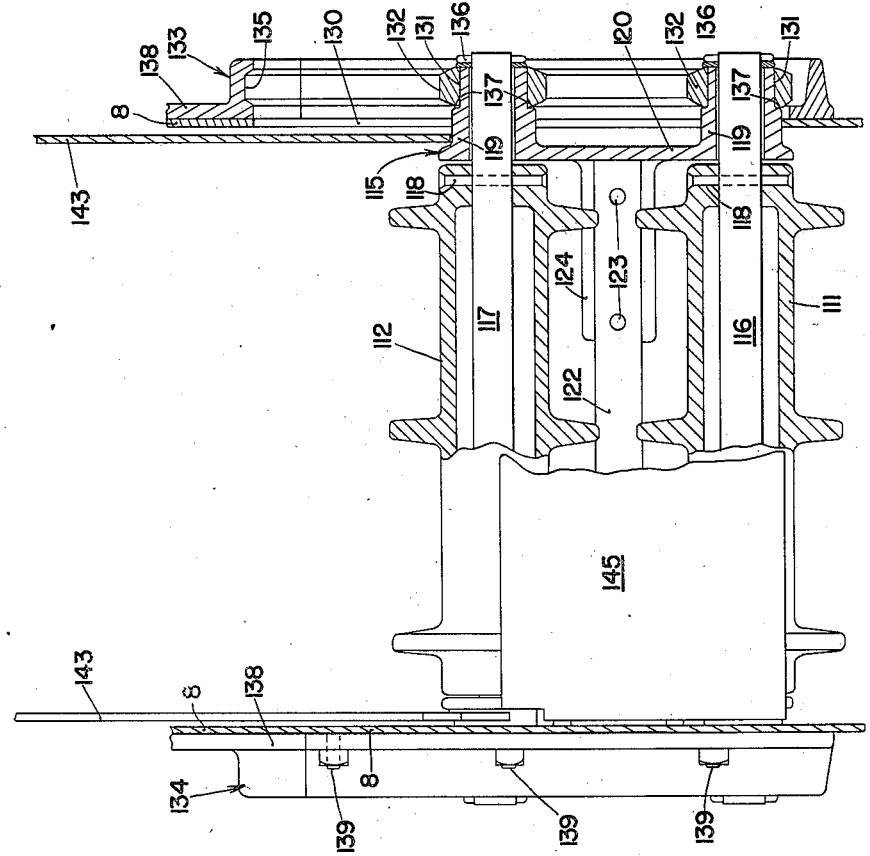
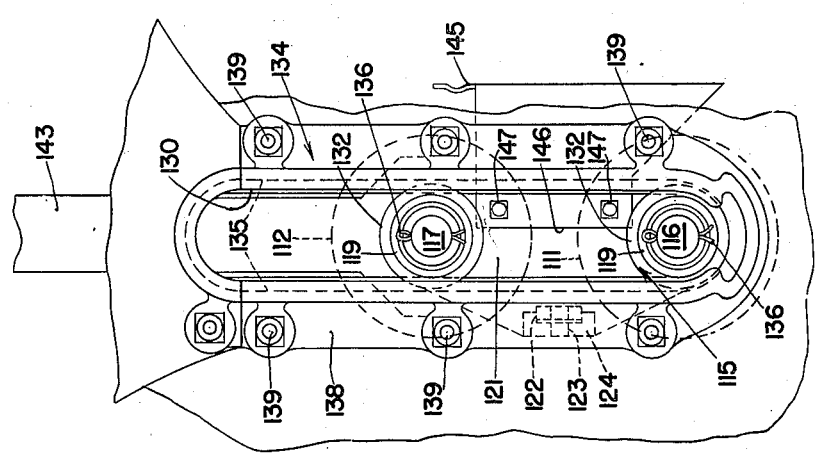

Patented May 27, 1947

2,421,124

UNITED STATES PATENT OFFICE 2,421,124

FEEDING DEVICE

Henry E. Korum, East Moline, Ill., assignor to Deere & Company, Moline, Ill., a corporation of Illinois Application April 26, 1944, Serial No. 532,839

20 Claims. (Cl. 198—162)

The present invention relates generally to feeding devices and more particularly to feeding devices of the class used for feeding crops such as cornstalks, hay, and other roughage into a comminuting machine, such as a roughage mill, which reduces the crop material to small pieces in the preparation of feed for stock. My invention is most advantageously applied to that type of feeder known as a belt type feeder, which is adapted to operate above a flexible endless belt or feed apron on which the crops are deposited for feeding to the cutter head, the purpose of the feeding device being to compress the crop material and force it over the cutter bar in a comparatively thin layer.

The belt type feeder comprises a flexible endless belt having a lower working flight which moves downwardly and inwardly toward the cutter bar for compressing the crop downwardly upon the latter, and is trained upwardly around a roller, which returns the belt to the outer roller.

In order to accommodate an uneven flow of material, the inner roller must be capable of moving up and down while applying a substantially constant compression force upon the crop. Heretofore, some difficulties have been encountered in operation due to the movable roller becoming cocked at an angle to the plane of the feeder apron as a result of wads of material passing under one end of the feed roller. It is one of the principal objects of the present invention, therefore, to provide a vertically shiftable mounting for the feed roller, which holds the latter substantially horizontal regardless of the distribution of crop material thereunder, thus preventing the feed roller from jamming and thus insuring a constant pressure upon the material. In the accomplishment of this object, the present invention contemplates mounting the feed roller upon a vertically shiftable carriage, which is mounted on wheels engageable with a set of substantially vertical tracks, for the purpose of guiding the feed roll as it moves up and down during operation, and holding it generally horizontal at all times. A related object has to do with the provision of a carriage for carrying a pair of vertically spaced rolls over which the feeder belt is trained.

A more specific object relates to the provision of a carriage for the feeder roll or rolls, in which the carriage supporting wheels are journaled directly on the carriage itself on suitable trunnions fixed to the carriage for that purpose, as contrasted with a design in which the carriage supporting wheels might be journaled on the roller supporting shaft which rotates constantly during operation. Thus, according to the principles of the present invention, there is no tendency for power to be transmitted from the feeder belt to the carriage supporting wheels, which would tend to shift the carriage up or down on the tracks.

Still another object of the present invention relates to the provision of a novel and improved means for driving the feeder belt, which accommodates the vertical shifting movement of the feeder roll without any necessity for idler pulleys to take up slack in the belt.

This application is a continuation-in-part of my application Serial No. 372,724, filed January 2, 1941, issued October 10, 1944, as Patent 2,359,995, and also of my application Serial No. 462,879, filed October 21, 1942.

Other objects and advantages of my invention will be apparent to those skilled in the art after a consideration of the following description, in which reference is had to the drawings appended hereto, in which:

Figure 2 is a sectional elevational view of the mill.

Figure 3 is a sectional elevational view taken along a line 3—3 in Figure 1, showing the details of the track-mounted carriage for supporting the inner belt roller.

Figure 5 is a fragmentary elevational view drawn to an enlarged scale, showing a side view of the roller carriage of the embodiment of Figure 4, and showing its track mounting.

Figure 6 is a fragmentary sectional elevational view showing the front of the roll-supporting carriage of Figure 5.

Figure 1:
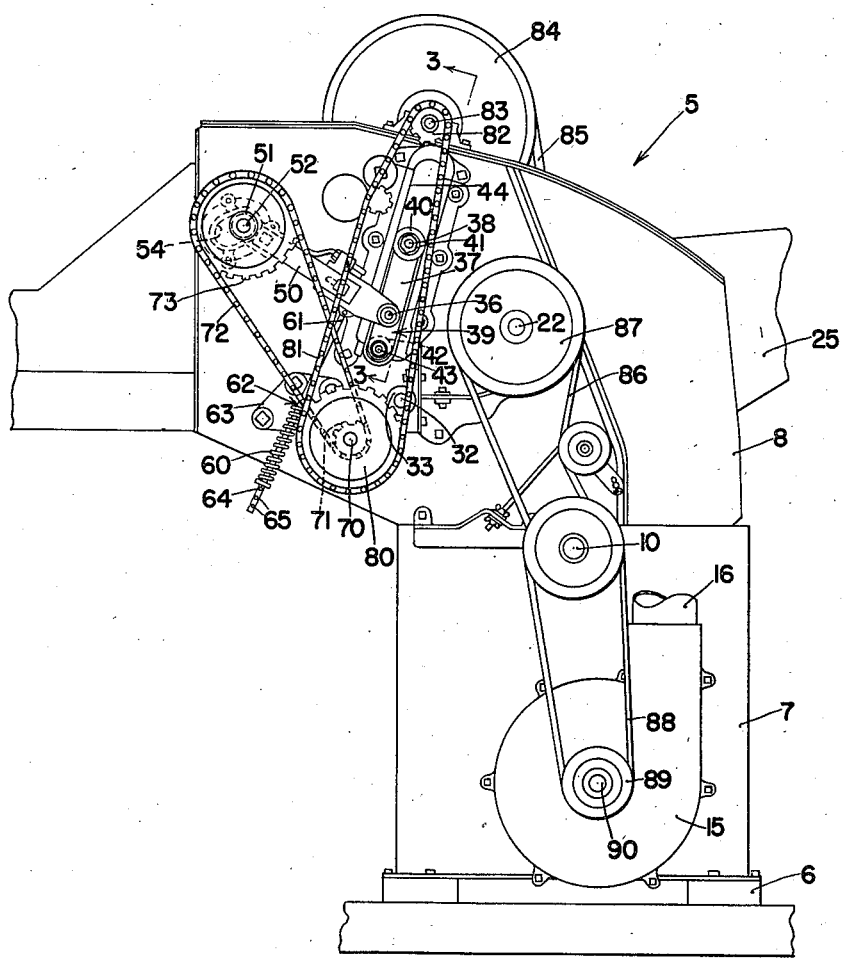
Figure 1 is a side elevational view of a roughage and hammer mill embodying the principles of the present invention.

Referring now to the drawings and more particularly to Figures 1, 2 and 3, the mill, indicated in its entirety by reference numeral 5, comprises a base 6, a lower housing section 7, and an upper housing portion 8. The lower housing section 7 contains a hammer mill rotor 9 including a supporting shaft 10, on which is mounted a plurality of radially extending hammers 11. A semi-cylindrical screen 12 is disposed beneath the rotor 9 and retains the crop material for grinding action by the rotor hammers 11 until the material is of a desired fineness, after which it drops through the screen 12 and into a trough 13. The details of the hammer mill mechanism are not a part of the present invention, but are shown and described in detail in my Patent No. 2,291,815, granted August 4, 1942. The ground material is drawn from the bottom of the trough 13 by means of a centrifugal fan 15 and is discharged through a discharge duct 16.

In the upper portion 8 of the housing is disposed a cutter head 20, comprising a plurality of cutting knives 21 of the lawn mower type mounted on a shaft 22 which is journaled in the upper housing portion 8. The knives 21 cooperate with a stationary cutter bar 23, mounted adjacent the path of movement of the knives 21. The cutter head 20 is disposed above the hammer mill rotor 9 so that the crops can be first fed to the cutter head for cutting them coarsely, after which they fall to the hammer mill rotor 9, which grinds them to any desired degree of fineness. Small grains such as wheat, oats and the like can be fed directly to the hammer mill rotor 9 through a feed chute 25. If roughage is desired, the hammer mill rotor 9 and screen 12 can be removed from the machine and the crop material can be collected directly from the cutter head 20 in the trough 13 below.

Coming now to that portion of the machine with which the present invention is more directly concerned, the crops are fed to the cutter bar 23 for chopping action by the blades 21 by means of a feeding mechanism indicated in its entirety by reference numeral 30. A lower feed roll 31 having a rough or serrated outer surface for traction purposes, is mounted on a shaft 32, which is journaled at opposite ends, respectively, in bearings 33 fixed to the upper housing portion 8.

An upper feed roll 35 cooperates with the lower feed roll 31 to force the crop material into the cutter head 20, but is mounted for upward yielding movement, by means which will be described presently, to accommodate a fluctuating rate of flow of crop material, while maintaining a positive feeding action thereon. The feed roll 35 comprises disk-like portions 35' mounted on a hub portion 36' which is journaled on a shaft or tie member 36. The shaft or tie member 36 is carried at opposite ends in a pair of side members 37. The side members are also interconnected by means of a tie member 38 at their upper ends, the members 36, 37, 38 forming a rigid carriage indicated in its entirety by reference numeral 39. The tie member 38 is threaded and is rigidly fixed to the side members 37 by nuts 38'. A pair of wheels 40 are journaled on the outer ends of the tie member 38 outside of the side members 37 and are retained on the tie member 38 by nuts 41. A second pair of wheels 42 is journaled at the lower ends of the side members 37, respectively, on stub shafts 43. The carriage 39 is supported in a pair of trackways 44, mounted on opposite side walls of the upper housing 8. The wheels 40, 42 on each side of the carriage engage one of the trackways 44, providing for vertical shifting movement of the carriage 39, and hence the feed roll 35, relative to the lower feed roll 31. Each trackway 44 comprises a pair of rails disposed on opposite sides of each wheel and are grooved to receive the wheels, and thus hold the carriage against twisting movement but permitting vertical rolling movement. This has the effect of preventing the upper feed roll 35 from twisting during operation, and thus preventing any tendency of the feed roll to bind or jam.

A pair of arms 50 are connected to opposite ends, respectively, of the tie member 36, outside the side members 37 and outside the housing walls, the opposite ends of the arms 50 being provided with hubs 51, in which is journaled a transverse shaft 52, on which is mounted a roll or sprocket member 53 within the housing 8. The shaft 52 extends through slots 54 in each of the walls of the housing 8, the slots 54 providing a path of translatory movement of the hubs 51 and shaft 52 toward and away from the trackway 44. Thus, when the carriage 39 slides up and down within the trackways 44, the latter being straight, the arms 50 shift the shaft 52 back and forth within the slots 54.

A flexible endless pressure web or belt 55 is trained over the rolls 35, 53, which are maintained at constant distance apart by the arms 50, and the pressure web serves to compress the incoming crop material against an endless type conveyor 56 on a feed table 57, and against the lower feed roll 31. The web 55 includes a plurality of transverse slats 58, through which pressure is applied to the crop material. Thus, it is evident that the pressure web 55 with its supporting rolls 35, 53, is shiftable at both ends to accommodate fluctuations in the amount of incoming crop material and to maintain a pressure thereon to compress the material and feed the same to the cutter head 20.

Pressure in excess of the weight of the pressure web is applied through compression springs 60, which encircle rods 61 attached to the arms 50 and extend downwardly therefrom. Each spring 60 acts against a pin 64 near the end of the rod 61 and reacts against a lug 62 on a bracket 63, fixed to the side wall of the housing 8. A plurality of apertures 65 is provided in the end of the rod 61 to permit adjustment of the amount of compression in the spring 60.

Power for driving the feeder web 55 is supplied through a drive shaft 70 disposed beneath the feed table conveyor 56 and journaled in the upper housing section 8. The drive shaft 70 is provided with a sprocket 71 outside the housing, which engages a drive chain 72, which drives a large sprocket 73 on the outer end of the shaft 52, which in turn drives the web roll 53.

It will be noted at this point that the slot 54 is arcuate about the axis of the shaft 70 and thus when the roll 53 and shaft 52 shift along the slot 54, the distance from the axis of the sprocket 73 to the axis of the drive shaft 70 and sprocket 71 does not change, and therefore does not tend to tighten or loosen the drive chain 72. This permits a free vertical movement of the feed roll 35 and the compression web 55, without affecting the power transmitting mechanism.

The drive shaft 70 is driven through a large sprocket 80 by means of a flexible drive chain 81, which is driven by a sprocket 82 on a shaft 83 journaled on the top of the upper housing section 8. A large belt pulley 84 is mounted on the opposite end of the shaft 83, and is driven by a belt 85 from a suitable pulley (not shown) on the opposite end of the cutter head shaft 22.

Power is obtained from a suitable prime mover such as a tractor engine or the like through a belt connected to a pulley (not shown) on the opposite end of the rotor shaft 10. Power is transmitted from this shaft by a belt 86 to a pulley 87 on the cutter head shaft 22 and through a belt 88 to a pulley 89 on the fan shaft 90.

The conveyor 56 is driven through a sprocket 91 at its inner end, which is carried on a shaft 92 journaled in the walls of the housing 8. Power is supplied to shaft 92 through a pair of gears 93, 94, fixed to shafts 92, 70, respectively. Shaft 70 is shiftable in slots 95 in the housing walls to adjust the gears 93, 94 to proper meshing relation. The lower feed roll 31 is provided with a sprocket 96 outside the housing, which is driven through a chain 97 from the shaft 92.

During operation, crop material is fed inwardly upon the table 57 by the conveyor 56. It is engaged by the pressure web 55, which compresses the material against the table and against the lower feed roll 31. The pressure web and its supporting rolls yield to an increased flow of crop material to a position indicated in dotted lines in Figure 2, the inner end of the pressure web as it bends over the roll 35 shifts up and down along a plane indicated at A. Any crop material that is carried over by the rotary cutter 20 is prevented from lodging on the web 55 by a baffle plate 100 having supporting flanges 101 bolted to the sides of the housing section 8 at opposite sides thereof. The baffle plate 100 curves downwardly above the cutter 20 and between the latter and the plane A of movement of the web, the lower end of the baffle being curved more abruptly downwardly, as indicated at 102, tangent to a plane substantially parallel to plane A to direct the material downwardly away from the web, and thus preventing material from being carried over the top of the pressure web.

Figure 4:
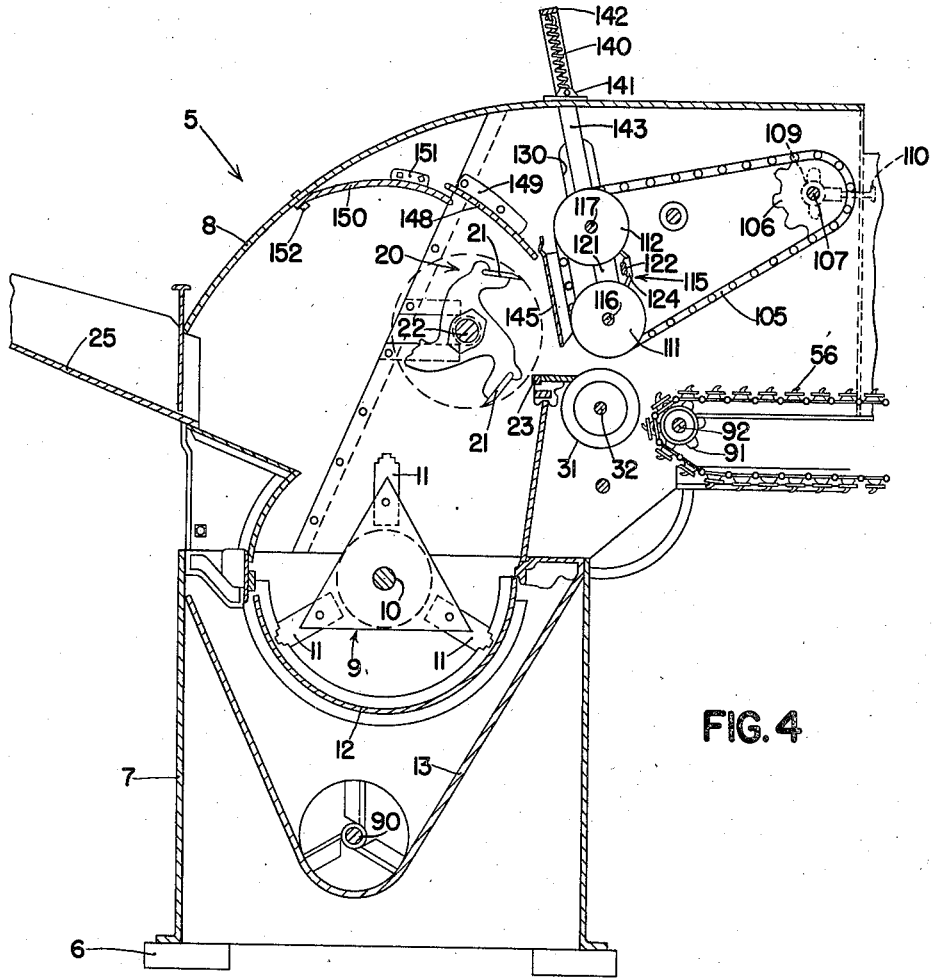
Figure 4 is a sectional elevational view showing a modification of my invention, in which the carriage is provided with a pair of vertically spaced feeder belt rollers.

Referring now more particularly to Figures 4, 5 and 6, cooperative with the lower feed roll 31 is a compression web 105, which comprises a flexible endless belt made up of a plurality of transversely disposed steel slats attached to a suitable connecting chain. The compression web 105 is trained around a driving roll or pulley 106, mounted on a supporting shaft 107 within the housing section 8. In this embodiment, the shaft 107 is journaled in the housing on a fixed axis and extends out of the housing in one direction to support a driving pulley (not shown). The bearings 109 of the shaft 107 are provided with suitable adjusting means 110 for the purpose of adjusting the tension in the compression web 105 by shifting the bearings 109 horizontally on the walls of the housing. The compression web 105 is trained over a pair of generally vertically spaced rolls 111, 112, thus defining a substantially triangular path of travel for the compression web or feeder belt 105. Thus, the feeder belt is adapted to travel downwardly on an incline from the driving pulley 106 to the lower roll 111 which is normally directly above the feeder roll 31 and serves to compress the crop material and feed the latter to the cutter head over the cutter bar 23. The feeder belt makes an abrupt bend over the roll 111 and travels generally vertically away from the feed roll 31 from which it returns to the driving pulley 106 over the upper roll 112.

In order to accommodate a variable amount of crop material fed to the cutter head 20, the rolls 111, 112 are mounted on a carriage, indicated generally by reference numeral 115. The carriage 115 is mounted in the housing section 8 by means which will be described presently, adapted to permit the carriage to rise and fall to exert a substantially constant pressure against the material being fed to the cutter head.

Each of the rolls 111, 112 is fixedly mounted on a supporting shaft 116, 117, respectively, and pinned thereto by pins 118 which extend through suitably aligned apertures in the rolls and shafts. The ends of the shafts 116, 117 are journaled in hubs 119, the two hubs at each end being supported in an end frame 120, 121, respectively. The two end frames 120, 121 are interconnected rigidly by means of a transverse frame member 122, which is securely fastened by bolts or rivets 123 to a pair of bosses 124 extending inwardly from the end frames 120, 121, respectively. Thus it is evident that the carriage 115 rigidly supports the rotatable rolls 111, 112, and by preventing twisting of one roll relative to the other, insures that the latter rotate freely in their bearings.

The carriage 115 is disposed within the housing section 8 with the two hub members 119 at each side of the carriage extending out through a generally vertical slot 130. Each of the hubs 119 has a cylindrical outer surface 131 on which is journaled a supporting wheel 132. The wheels 132 engage a pair of track members 133, 134 disposed on opposite sides of the housing section 8. Each of the track members 133, 134 comprises a pair of oppositely disposed channel-shaped tracks or rails 135 adapted to engage the opposite sides of each of the wheels 132, guiding the latter for vertical rolling movement but preventing lateral axial movement of the wheels, and thus preventing the carriage from moving axially within the housing. The tracks 135 on each of the track members 133, 134 are spaced apart a distance slightly greater than the diameter of the wheels 132, so that the latter may roll freely on either track, depending upon the direction of pressure of the carriage upon the wheel.

The cylindrical portions 131 of the hubs 119, on which the wheels 132 are journaled, are reduced in diameter to provide shoulders 137 against which the wheels bear to resist the end thrust of the frame. The hubs 119 are secured on the shafts 116, 117 by cotter pins 136 inserted through apertures in the ends of the shafts outside the hubs 119.

The tracks 135 are formed integral with supporting flanges 138 which are secured by bolts 139 to the side walls of the housing.

The web 105 is urged downwardly against the crop material not only by the weight of the carriage 115 but also by pressure exerted by springs 140, which are connected between a boss 141 on top of the housing 8 and a transverse bar 142 which is supported at opposite ends upon a pair of generally vertically disposed bars 143 extending downwardly through apertures in the top of the housing 8 and which are bifurcated at their lower ends to fit over the upper hubs 119 to transmit the pressure of the springs 140 upon the latter.

In order to prevent the crop material from being thrown by the cutter head into engagement with the vertical portion of the feeder belt 105, a baffle 145 extends transversely between the cutter head and the vertical portion of the belt. The baffle 145 comprises a plate, ends 146 of which are bent toward the carriage 115 and are rigidly fixed thereto by bolts 147. A stationary baffle 148 is flanged at 149 at opposite ends thereof, and is supported within the housing section 8 with its lower end substantially in contact with the baffle 145. Another stationary baffle 150 is supported by flanges 151 on opposite side walls of the housing 8 and extends from the upper end of the stationary baffle 148 to the top wall of the housing portion 8, to which it is fixed by bolts means 152. It is obvious that as the carriage rises in the slot 130, the movable baffle 145 maintains a position close to the stationary baffle 148 to prevent material from being thrown therebetween. By making the carriage travel in a straight line instead of on an arc about the axis of the pulley 106, it is possible to position the roller 111 at a minimum distance from the cutter bar 23 and thus to maintain control of the material being fed to the cutter head. If the carriage 115 moved on an arc about the pulley shaft 107, the baffle 145 would have to be curved instead of straight, which would require the lower feed roller 111 to be moved farther away from the cutter head and the cutter bar.

I do not intend my invention to be limited to the exact details shown and described herein, except as set forth in the claims which follow.

I claim:

1. In a feeding device of the class described, the combination of a roll, a generally vertical carriage in which said roll is journaled comprising a rigid frame including a pair of end frame members, aligned bearing means on said members, respectively, for supporting said roll, a transverse frame member rigidly tying said end frame members together, and a pair of vertically spaced wheels journaled at each side of said rigid frame, and track means at each side of said carriage generally parallel to said end frame members to support each of said pairs of wheels, providing for vertical sliding movement of said vertical carriage relative to said track means.

2. In a feeding device of the class described, the combination of a roll, a generally vertical carriage in which said roll is journaled comprising a pair of end frame members, aligned bearing means on said members, respectively, for supporting said roll, a transverse frame member rigidly tying said end frame members together, a pair of trunnions fixed to said end frame members and projecting laterally outwardly from opposite sides of said carriage, respectively, a pair of wheels journaled on said trunnions, respectively, and a second pair of wheels disposed on opposite sides of said carriage and mounted on said frame members, respectively, for rotation in the planes of rotation of the first mentioned wheels, respectively, and generally vertical track means disposed at each side of said carriage substantially in said planes of rotation of said wheels and adapted to cooperate with the latter for supporting the same, providing for vertical shifting movement of said carriage relative thereto.

3. In a feeding device of the class described, the combination of a roll, a generally vertical carriage in which said roll is journaled comprising a pair of end frame members, aligned bearing means on said members, respectively, for supporting said roll, a transverse frame member rigidly tying said end frame members together, a pair of trunnions fixed to said end frame members and projecting laterally outwardly from opposite sides of said carriage, respectively, a pair of wheels journaled on said trunnions, respectively, and a second pair of wheels disposed on opposite sides of said carriage and mounted on said frame members, respectively, for rotation in the planes of rotation of the first mentioned wheels, respectively, and generally vertical track means disposed at each side of said carriage substantially in said planes of rotation of said wheels, each of said track means comprising parallel rails on diametrically opposed sides of the wheels associated therewith and engageable with each of said wheels at axially spaced points thereon for guiding said wheels in their respective planes of rotation.

4. In a feeding device of the class described, the combination of a roll, a generally vertical carriage in which said roll is journaled comprising a pair of end frame members, aligned bearing means on said members, respectively, for supporting said roll, a transverse frame member rigidly tying said end frame members together, a pair of coaxially aligned trunnions fixed to said end frame members and projecting laterally outwardly from opposite sides of said carriage, respectively, and a pair of wheels journaled on said trunnions, respectively, a second pair of coaxially aligned wheels disposed on opposite sides of said carriage and rotatably mounted on said frame members in vertical alignment with the first mentioned wheels, respectively, and track means disposed at each side of said carriage, each track means comprising grooved parallel rails on diametrically opposite sides of the vertically spaced wheels associated therewith for receiving the latter and adapted to guide said carriage in vertical shifting movement, and a feed belt trained over said roll.

5. For use in a comminuting machine, a pair of vertically spaced feed belt rolls, carriage means in which said rolls are journaled comprising a rigid frame and a pair of vertically spaced wheels journaled at each side of said frame, and track means at each side of said carriage means and generally parallel thereto to support each of said pairs of wheels, providing for vertical bodily shifting movement of said carriage means substantially in the plane of the latter.

6. For use in a comminuting machine, a pair of vertically spaced feed belt rolls, supporting shafts therefor, and carriage means for carrying said shafts in spaced relation to each other comprising a pair of end frame members, a transverse frame member rigidly tying said end frame members together, a pair of vertically spaced bosses fixed to each of said end frame members and apertured to receive said roll supporting shafts, and a wheel journaled on each of said bosses and adapted to roll in suitable tracks on the machine.

7. For use in a comminuting machine, a pair of vertically spaced feed belt rolls, supporting shafts on which said rolls are fixed, and carriage means for rotatably carrying said shafts in spaced relation to each other, comprising a pair of end frame members, each member having a pair of vertically spaced cylindrical bosses apertured to provide bearings for the ends of said shafts, a wheel journaled on the outer cylindrical surface of each of said bosses and adapted to roll in suitable tracks on the machine, and a transverse frame member rigidly interconnecting said end frame members.

8. In a comminuting machine having a housing, a feeder belt in said housing, a roller for said belt journaled in normally fixed position in said housing, a pair of vertically spaced rolls over which said belt is trained, and carriage means for rotatably supporting said rolls in substantially vertically spaced relation to each other, comprising a pair of end frame members on which said rolls are journaled at opposite ends, respectively, a transverse frame member rigidly tying said end frame members together, a pair of vertically disposed track members mounted on opposite sides of said housing, and a pair of vertically spaced wheels journaled on each of said end frame members and adapted to follow said track.

9. In a comminuting machine having a housing, a feeder belt in said housing, a roller for said belt journaled in normally fixed position in said housing, a pair of vertically spaced rolls over which said belt is trained, and carriage means for rotatably supporting said rolls in substantially vertically spaced relation to each other comprising a pair of end frame members, each member having a pair of vertically spaced cylindrical bosses fixed thereto and apertured to provide journal bearings for said rolls, a transverse frame member rigidly tying said end frame members together, a pair of vertically disposed track members mounted on opposite sides of said housing, and a wheel journaled on each of said cylindrical bosses and adapted to follow one of said track members.

10. For use in a comminuting machine including a housing, a feed belt in said housing, a roll for said belt, a pair of end frame members, a transverse frame member rigidly tying said end frame members together, means for rotatably supporting said roll between said end frame members, a baffle supported on said end frame members and extending therebetween alongside said roll, a pair of vertically spaced wheels journaled on each of said end frame members, and a substantially vertically disposed track member on each side of said housing, said wheels being adapted to engage said track members to provide for substantially vertical movement of said roll but preventing said baffle from tilting.

11. In a feeding device of the class described, a frame having oppositely disposed trackways, a feed roll, and a carriage for supporting said feed roll comprising a pair of side members, a pair of wheels journaled near opposite ends, respectively, of each of said side members and operatively engaging said trackways, and a transverse frame member having its opposite ends connected to said side members, respectively, at points intermediate the associated pair of wheels, said feed roll being rotatably supported at opposite ends, respectively, on said side members.

12. In a feeding device of the class described, a frame having oppositely disposed trackways, a feed roll, and a carriage for supporting said feed roll comprising a pair of side members, a pair of wheels journaled near opposite ends, respectively, of each of said side members and operatively engaging said trackways, and a transverse frame member interconnecting said side members at points intermediate each pair of wheels, a pair of arms swingably connected to said carriage at opposite ends, respectively, of said transverse member, and means for swingably supporting the opposite ends of said arms on said frame.

13. In a feeder of the class described, a frame having oppositely disposed trackways, a feed roll, a carriage for supporting said feed roll comprising a pair of side members, a pair of wheels journaled at opposite ends, respectively, of each of said side members and operatively engaging said trackways, and a transverse tie member interconnecting points on said side members intermediate each pair of wheels, said feed roll being rotatably supported on said tie member, a pair of arms connected at opposite ends, respectively, of said tie member, a second feed roll rotatably supported at the other ends of said arms, and a flexible endless pressure web trained over said feed rolls.

14. In a feeder of the class described, a frame having oppositely disposed trackways, a feed roll, a carriage for supporting said feed roll comprising a pair of side members, a transverse tie member interconnecting said side members at one end of said carriage, wheels rotatably mounted on said tie member and engageable with said trackways, wheels mounted at the opposite ends of said side members, respectively, a second tie member interconnecting said side members at points intermediate of the ends of the latter between said wheels, said feed roll being rotatably mounted on said second tie member between said side members, a pair of arms swingably connected to the outer ends of said second tie member extended beyond the outer sides of said side members, a second feed roll rotatably supported between the other ends of said arms, and a flexible endless pressure web trained over said feed rolls.

15. In a feeder of the class described, a frame, a feed belt roll, bearing means in which said roll is rotatably supported, said bearing means being movable in one direction in said frame, a flexible endless pressure web trained over said roll, a second roll over which said web is trained, a second bearing means in which said second roll is journaled, an arm interconnecting said second bearing means with said bearing means for the feed belt roll, means on said frame shiftably supporting said second bearing means and constraining the latter to movement in a path disposed at an acute angle to the direction of shifting movement of said feed belt roll, whereby movement of the latter causes a shifting movement of said second roll along said path, a drive wheel on said second roll, a drive shaft journaled on said frame at a point substantially equidistant from all points in said path within the range of shifting movement of said second roll, and a flexible endless member for transmitting power from said drive shaft to said drive wheel.

16. In a feeder of the class described, a frame, a feed belt roll, bearing means in which said feed belt roll is rotatably supported, said bearing means being movable in said frame along a straight line, a flexible endless pressure web trained over said roll, a second roll over which said web is trained, a second bearing means in which said second roll is journaled, an arm interconnecting said second bearing means with said bearing means for the feed belt roll, means on said frame shiftably supporting said second bearing means and constraining the latter to movement along an arcuate path diverging from the line of movement of said feed belt roll whereby movement of the latter causes a shifting movement of said second roll along said path, a drive wheel on said second roll, a drive shaft journaled on said frame at the center of the arc of curvature of said path, and a flexible endless member for transmitting power from said drive shaft to said drive wheel.

17. In a feeder of the class described, a frame, a feed belt roll, a carriage on which said roll is journaled, said carriage having spaced supporting wheels on opposite sides thereof, straight trackways on said frame cooperating with said wheels to support said carriage for shifting movement along a straight line, a flexible endless pressure web trained over said feed belt roll, a second roll over which said web is trained, bearing means in which said second roll is journaled, a pair of arms disposed on opposite sides of said frame, respectively, swingably connecting said bearing means with said carriage, guideways on opposite sides of said frame for supporting said bearing means and providing for shifting movement relative thereto along an arcuate path toward and away from said trackways, whereby shifting movement of said carriage causes a shifting movement of said bearing means along said path, a drive shaft journaled on said frame at the center of the arc of curvature of said path, and power transmitting means interconnecting said drive shaft and said second roll, said power transmitting means being swingable around the axis of said drive shaft with said second roll as said carriage and feed belt roll shifts along said trackway.

18. In a feeding device of the class described, a frame having oppositely disposed trackways, a feed roll, and a carriage for supporting said feed roll comprising a pair of side members, a pair of wheels journaled near opposite ends, respectively, of each of said side members and operatively engaging said trackways, and a transverse frame member having its opposite ends connected to said side members, respectively, at points intermediate the associated pair of wheels, said feed roll being rotatably supported on said transverse frame member.

19. In a feeding device of the class described, a frame having oppositely disposed trackways, a feed roll, and a carriage for supporting said feed roll comprising a pair of side members, a pair of wheels journaled near opposite ends, respectively, of each of said side members and operatively engaging said trackways, a transverse frame member having its opposite ends connected to said side members, respectively, at points intermediate the associated pair of wheels, said feed roll being rotatably supported on said transverse frame member, a pair of arms swingably connected to said carriage at opposite ends, respectively, of said transverse member, and means for swingably supporting the opposite ends of said arms on said frame.

20. In a feeding device of the class described, a frame having oppositely disposed trackways, a feed roll, and a carriage for supporting said feed roll comprising a pair of side members, said members having hubs integral therewith intermediate the ends thereof, a transverse frame member extending through said hubs interconnecting said side members, a pair of arms mounted on opposite ends, respectively, of said transverse member outside said hubs and swingably mounted at their other ends on said frame, and pairs of wheels journaled on said side members, respectively, on axes positioned on opposite sides of said transverse member, respectively, said wheels engaging said trackways to support said carriage, and means for rotatably supporting said feed roll on said transverse frame member.

HENRY E. KORUM.

REFERENCES CITED

The following references are of record in the file of this patent:

UNITED STATES PATENTS

| Number | Name | Date |
|---|---|---|
| 1,440,391 | Kane | Jan. 2, 1923 |
| 2,230,018 | Stromstad | Jan. 28, 1941 |
| 1,769,348 | Krummel | July 1, 1930 |
| 1,290,747 | Howe | Jan. 7, 1919 |
| 539,814 | Johnson | May 28, 1895 |
| 1,248,747 | Stubbs | Dec. 4, 1917 |
| 850,838 | Johnsen | Apr. 16, 1907 |
| 890,385 | Thurman | June 9, 1908 |
| 1,305,607 | Johnson | June 3, 1919 |
| 722,689 | Frink et al. | Mar. 17, 1903 |